US008628137B2

(12) United States Patent
Platt et al.

(10) Patent No.: US 8,628,137 B2
(45) Date of Patent: Jan. 14, 2014

(54) PROFILE ELEMENT CONNECTING A VEHICLE PANE TO A WATER DRAINING CHAMBER

(75) Inventors: Wolfgang Platt, Biedenkopf (DE); Michael Ortmüller, Biedenkopf (DE); Daniel Weller, Sinn (DE)

(73) Assignee: Elkamet Kunststofftechnik, Biedenkopf (DE)

( * ) Notice: Subject to any disclaimer, the term of this patent is extended or adjusted under 35 U.S.C. 154(b) by 0 days.

(21) Appl. No.: 12/993,876

(22) PCT Filed: Apr. 30, 2009

(86) PCT No.: PCT/EP2009/003143
§ 371 (c)(1),
(2), (4) Date: Dec. 17, 2010

(87) PCT Pub. No.: WO2009/141049
PCT Pub. Date: Nov. 26, 2009

(65) Prior Publication Data
US 2011/0115261 A1 May 19, 2011

(30) Foreign Application Priority Data

May 23, 2008 (DE) ..................... 20 2008 006 986 U

(51) Int. Cl.
*B60J 1/00* (2006.01)
(52) U.S. Cl.
USPC ............................................ 296/93; 296/84.1
(58) Field of Classification Search
USPC ................................. 296/208, 84.1, 93, 96.21
See application file for complete search history.

(56) References Cited

U.S. PATENT DOCUMENTS

| 3,363,364 A | 1/1968 | Cadiou |
| 7,806,455 B2 | 10/2010 | Polke |
| 2003/0057660 A1 | 3/2003 | Ortmuller et al. |

FOREIGN PATENT DOCUMENTS

| CA | 2008350 A1 | 7/1990 |
| DE | 200 08 555.7 | 5/2000 |
| DE | 199 59 602 | 6/2001 |

(Continued)

OTHER PUBLICATIONS

European Paten Office, International Search Report in International Patent Application No. PCT/DE2009/001028 (Dec. 14, 2009).

(Continued)

*Primary Examiner* — Glenn Dayoan
*Assistant Examiner* — Melissa A Black
(74) *Attorney, Agent, or Firm* — Leydig, Voit & Mayer, Ltd.

(57) ABSTRACT

A profile element for connecting a vehicle pane to a water draining chamber includes a first segment affixable to the vehicle pane. A second segment has, at an upper portion, a bearing rib having at least one seal configured to be disposed at a lower edge of the vehicle pane and, at a lower portion, a snap-in recess configured to receive rib of the water draining chamber through an engagement aperture which is delimited in the insertion direction by a lower-most surface of the bearing rib and an upper-most surface of the resilient leg. A detent element is disposed in the snap-in recess so as to facilitate inserting the rib of the water draining chamber in an insertion direction into the snap-in recess and present a larger resistance to extracting the rib from the snap-in recess in an extraction direction opposite the insertion direction.

20 Claims, 3 Drawing Sheets

(56) References Cited

FOREIGN PATENT DOCUMENTS

| | | |
|---|---|---|
| DE | 101 22 637 | 10/2002 |
| EP | 0 249 560 | 12/1987 |
| EP | 1 361 098 | 11/2003 |
| EP | 1 571 069 | 9/2005 |
| EP | 1 634 753 | 3/2006 |
| EP | 1 724 141 | 11/2006 |
| FR | 2 817 302 | 5/2002 |
| JP | H08240213 A | 9/1996 |
| JP | 3068533 Y | 5/2000 |
| JP | 2003532574 T | 5/2003 |
| JP | 2003341369 A | 12/2003 |
| SU | 1779228 A3 | 11/1992 |
| WO | 2006/002891 | 1/2006 |

OTHER PUBLICATIONS

Price Quotation 3371-B by Creative Extruded Products to Pilkington NA, Northwood, OH, "GMX511/521 AIP Retainer with in line 2D roll bend," pp. 1-4 (Sep. 26, 2007).

Price Quotation 3417 GMX511/521 AIP by Creative Extruded Products to Plikington NA, Northwood, OH, "GMX511/521 AIP Moldings," pp. 1-4 (Jan. 11, 2008).

Price Quotation 3288 by Creative Extruded Products to Saint Gobain, Shelby Twp, MI 48315, "GMX511/521 Lower Molding," pp. 1-9 (Oct. 6, 2006).

PROFILE ELEMENT CONNECTING A VEHICLE PANE TO A WATER DRAINING CHAMBER

CROSS-REFERENCE TO PRIOR APPLICATIONS

This application is a U.S. National Phase application under 35 U.S.C. §371 of International Application No. PCT/EP2009/003143, filed on Apr. 30, 2009, and claims benefit to German Patent Application No. DE 20 2008 006 986.6, filed on May 23, 2008. The International Application was published in German on Nov. 26, 2009 as WO 2009/141049 under PCT Article 21(2).

FIELD

The present invention relates to a profile element connecting a motor vehicle pane to a water draining chamber.

BACKGROUND

A water draining chamber is used in motor vehicles underneath the vehicle pane for instance the windshield, said box collecting water from said pane and draining it sideways. Illustratively an extruded profile element or contoured extrusion molded element is used to affix the water draining chamber to and seal it against the lower edge of the pane and furthermore is fitted with a snap-in groove to detachably receive said box.

To preclude forming an offset or an edge in the transition zone between the pane surface and the profile element, the published German patent document DE 200 08 555 U1 discloses a design for sealing vehicle panes and including a cross-sectionally hooked profile element which is bonded to the lower edge of the vehicle pane. Said profile element comprises a resilient leg which, together with a ribbed wedge, constitutes an outwardly open snap-in seat. Said snap-in seat receives the water draining chamber which is fitted on its back side with a detent rib. A sealing lip is fitted onto the ribbed wedge and may be fitted between the lower pane edge and the upper edge of the water draining chamber's lid and in its assembled position ends flush with the external surfaces of water draining chamber and vehicle pane. A buffer strip made of a softer material is configured below the snap-in groove and allows resting the seal against the vehicle body.

The profile element must be supported by the vehicle body because a high resistance must be overcome when the water draining chamber is inserted perpendicularly to the pane surface into the profile element. In turn said resistance is required to always reliably affix the water draining chamber to said element, that is, in order not to accidentally coming loose when in motion on the road or on account of other mechanical or thermal loads. On the other hand maintenance frequently entails detaching the water draining chamber from the vehicle pane and reassembling it for instance when changing a filter.

However relatively high forces are always encountered when installing the water draining chamber and they directly act on the adhesive bond between the profile element and the vehicle pane. In the absence of the contoured body resting on the vehicle body or absent per se from such a body, there is danger of the installation stresses detaching the profile element from the vehicle pane.

The profile elements of the state of the art moreover incur the further drawback that resting on the vehicle body may entail annoying noises, especially so when the highly compliant support elements lose their elasticity with time.

SUMMARY

Accordingly it is the objective of the present invention to overcome the drawbacks of the state of the art and to create a profile element which links a vehicle pane to a water draining chamber and which may be manufactured economically using simple means while also allowing simple, rapid water draining chamber installation without thereby stressing the connection between the profile element and the vehicle pane. Nevertheless the water draining chamber shall be durably affixed to the profile element and withstand even larger loads in problem-free manner.

As regards a profile element which connects a vehicle pane and a water draining chamber and which comprises a first segment affixable to said pane, further a second segment subtending a snap-in recess designed to detachably affix the water draining chamber, said box being fitted with a rib affixable in frictionally locking and/or geometrically interlocking manner into said snap-in recess, moreover at least one seal which can be inserted between the vehicle pane's lower edge and the water draining chamber's upper edge and which constitutes, in the installed state of the water draining chamber, a substantially smooth transition where the adjoining surfaces are mutually flush, the present invention calls for at least one detent element that is designed to ease inserting the water draining chamber's rib into the snap-in recess in a first direction whereas extracting the rib from the snap-in recess in the opposite direction is made more difficult.

This design allows installing the water draining chamber easily and quickly because its rib—compared to conventional profile elements—can be inserted at substantially less resistance respectively with much less force into the associated snap-in recess. Accordingly much smaller forces will act on the profile element and on its bond to the vehicle pane, and consequently said profile element cannot unintentionally detach from said pane, not even after installing and dismantling the water draining chamber repeatedly. Furthermore a complex support of the profile element by the vehicle body is not required, this feature advantageously affecting manufacturing and installation costs. Clatter and the like no longer may arise when there is relative displacement between the profile element and the vehicle body.

On the other hand, extracting the rib in the design of the present invention of said detent element, and as a result, following its installation, the water draining chamber shall always be firmly affixed to said profile element. The water draining chamber even when subjected to considerable mechanical and thermal stresses is unable to detach off the profile element or even from the vehicle, so that high operational reliability is assured. The system as a whole offers a simple design and is unusually dimensionally stable.

Advantageously, when controlling the forces of insertion and extraction, the respectively each detent element is configured at an angle to the direction of mating. Illustratively, a slight sideways bending or pressure may be applied when inserting the water draining chamber's rib into the snap-in recess, whereas, when removing said box, the rib first must ram the detent element before latter will release it.

On account of the angular position of the detent element relative to the direction of installation, the, respectively each, detent element constitutes a barbed hook for the rib inserted into the water draining chamber's snap-in recess, as a result of which said box can be detached off the profile element only after overcoming the barbed hook's resistance by applying a predetermined force, illustratively for the purpose of maintaining or replacing components situated underneath. On the other hand, the resistance presented by the barbed hook encountered when inserting the rib into the snap-in recess is relatively easily overcome and as a result the profile element and its bond to the vehicle pane are hardly stressed.

Advantageously too the, respectively each, detent element shall be at least partly elastically deformable. Such a detent element will yield relatively easily when inserting the rib into the snap-in recess, whereas making it quite difficult for the detent element to move out of the way when extracting the rib from the profile element in spite of said elasticity, for instance because the detent element perforce being rammed before releasing the rib. The barbed hook operation may be enhanced by fitting the, respectively each, snap-in recess at its free lengthwise edge with a convex or beaked edge which, depending on design, rests on the water draining chamber's rib and/or on the profile element.

In one embodiment of the present invention, the, respectively each, detent element is configured within the snap-in recess and can be made to engage frictionally and/or in a geometrically interlocking manner with the water draining chamber's rib. This design allows very different embodiment modes. Illustratively the detent element may be mounted, at an angle to the direction of installation, on a bearing rib of the profile element and/or to a resilient leg of the snap-in leg of the snap-in recess.

Further advantages are attained when the snap-in recess is fitted with or subtends an engagement aperture which is entered at least in part by the, respectively each, detent element. In this manner, when being inserted into the snap-in recess, the water draining chamber's rib at once engages the detent element which initially is thereby forced inward away from the rib, as a result of which the water draining chamber is installed easily, namely not requiring a large force. However, following snapping the rib into the snap-in recess, the detent element will engage the rib. Furthermore said detent element constitutes a barbed hook and, on account of its angular position, may only be forced to the side after overcoming a substantial resistance. In spite of having been easily installed, the water draining chamber no longer may be unintentionally detached from the profile element.

Additional dimensional stability is assured by a design, whereby the convex, resp. beaked edge, of the, resp. each, detent element rests against the water draining chamber when this chamber is in its installed position. Said rib may be appropriately fitted with an indentation, an offset or the like.

In addition or alternatively to the above design, the, respectively each, detent element may be mounted at the water draining chamber's rib, the detent element being able to engage the profile element frictionally and/or in geometrically interlocking manner. This approach as well assures both easily and quickly installing the water draining chamber without thereby stressing the connection between the profile element and the vehicle pane during said installation. At the same time the water draining chamber installed on the profile element is affixed so firmly that the entire system easily withstands even larger loads while simultaneously allowing water draining chamber disassembly, without damage to the profile element.

In this embodiment, the detent element acts as a barbed hook for the profile element, this barbed hook significantly reducing the forces required for connection but nevertheless firmly affixing the installed water draining chamber. In this design the convex or beaked edge of the, respectively each, detent element rests on the bearing rib or the resilient leg that for that purpose may be fitted with an indentation, an offset or the like.

In another embodiment of the present invention, a bearing rib is subtended between the first and second segments of the profile element and bears the minimum of one seal. Said seal assures sealing the surface transitions between the water draining chamber and the vehicle pane, the bearing rib per se constituting an elastic clamping and/or rest element between the lower windshield edge and the water draining chamber's rib.

The profile element's snap-in recess is subtended by a resilient leg and the bearing rib, the free end of said leg together with said rib bounding an engagement aperture. The resilient leg in principle may be L, U shaped or hook-like. The free end of the resilient leg moreover may be fitted with an indentation within the snap-in recess to be engaged by the water draining chamber's rib or the detent element.

Accordingly the water draining chamber's rib when in the locked position always is firmly enclosed by the outwardly projecting resilient leg, the bearing rib for the rib constituting a wedge. Simultaneously the bearing rib supports the seal, as a result of which the profile element not only seals the water draining chamber and the vehicle pane from each other but also connects them frictionally and in geometrically interlocking manner. Additional snap-in designs may be provided by an indentation at the bearing rib within the snap-in recess, for instance for the water draining chamber's rib or the detent element.

The resp. each seal and/or the, resp. each, detent element preferably are firmly bonded to the bearing rib. However all components also may be integral. In this manner many designs are possible, namely by making the particular components in one or more parts.

Preferably the seal and the detent element are made of a highly resilient material whereas the segments of the profile element and the bearing rib are made of a stiffer but still elastic material. The particular components of the profile element as a whole however may be made of a compound material, for instance in the form of a composite of soft and hard resilient materials. Illustratively the sealing lip may be externally highly compliant outside while of low compliance inside; in particular it may be hollow-hard inside and soft on the outside. Other variations also apply. The detent element may be externally soft and harder but still flexible on the inside. Again its cross-section may vary in shape, for instance being square/rectangular, oval or concave. The detent element's shape also may be individual, namely matching the water draining chamber's rib, or being at least segment-wise tubular. The profile element's bearing rib may be substantially wedge-shaped, stepped, T-like or U-shaped. Other shapes also are conceivable and applicable.

The first segment, the second segment and/or the bearing rib are fitted at least in part with a resilient stiffening insert. As a result the profile element as a whole can withstand high loads and is permanently dimensionally stable.

Manufacturing-wise, the first segment, the second segment and/or the bearing rib advantageously shall be extruded as a section. This feature is economical.

The entire sealing system is intended for vehicle panes, in particular for the lower portion of a motor vehicle windshield. It consists of the vehicle pane, the profile element affixed to it, and the water draining chamber to be affixed therein.

The profile element enables quickly and simply installing the water draining chamber without requiring applying a large force, as a result of which the connection between the profile element and the vehicle pane shall not be stressed even when repeatedly installing the water draining chamber. At the same time the water draining chamber when in its installed position is kept in frictionally and geometrically interlocking manner in the profile element, resulting in a durable firm connection which also permanently withstands substantial mechanical and thermal loads. Nevertheless the water draining chamber may be repeatedly removed for instance to replace a pollen filter, even though the removal force is larger than that of installation.

Further features, particulars and advantages are defined in the claims and are discussed in the illustrative embodiment modes below and with respect to the attached drawings.

DETAILED DESCRIPTION

Figure 1:
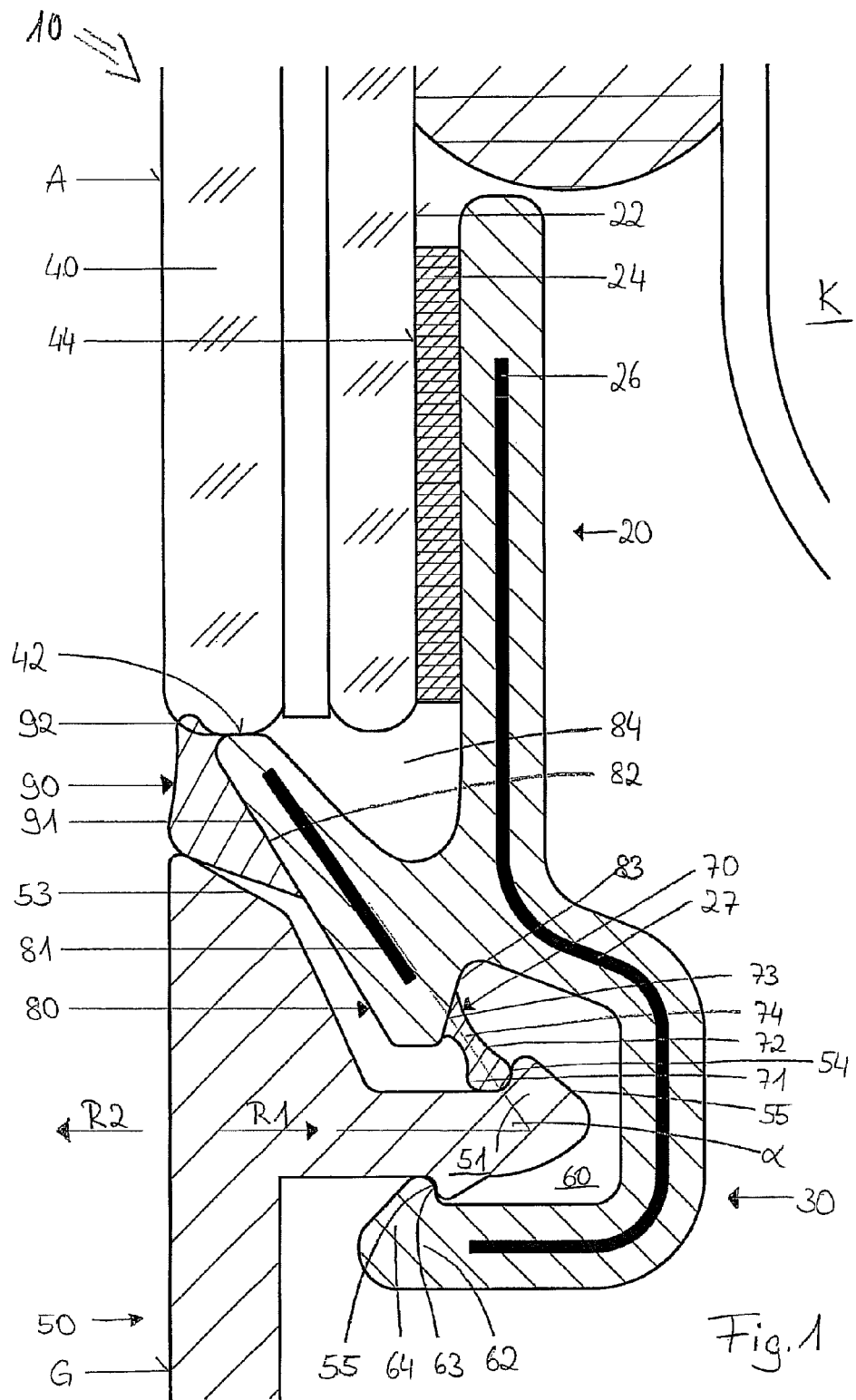
FIG. 1 is a schematic section of an installed sealing system with a profile element of the invention.

The profile element denoted by the overall reference 10 in FIG. 1 connects a vehicle pane 40 and a water draining chamber 50. Illustratively the vehicle pane 40 is motor vehicle windshield made of a composite glass and integrated in an omitted vehicle body of car (also omitted). The water draining chamber 50 is usually made of plastic and by its upper edge 53 abuts the mostly curved lower edge 42 of the windshield 40, and guides water running down said windshield to the outside. Preferably the outer surface G of the water draining chamber 50 is situated flush with the outer surface A of the windshield 40.

Preferably the profile element 10 is an extruded element of which the length corresponds to the width of the windshield 40 respectively to the width of the water draining chamber. It consists of one or more plastics (thermoplastic or thermosetting) each of a suitable hardness, for instance polypropylene (PP), polyvinylchloride (PVC), acrylonitrile-butadiene-styrene copolymers (ABS) or the like and combinations thereof. However elastomers and rubber materials such as EPDM are also applicable. A first segment 20 of the profile element 10 is fitted with a surface 22 for affixation to the vehicle pane 40. A double-sided adhesive tape 24 is deposited as the adhesive layer 24 on said surface 22 and illustratively is heat activated. The profile element 10 together with the adhesive tape 24 is pressed along the pane edge 42 against the back side 44 of the vehicle pane 40 and bonds to it.

The profile element 10 further comprises a second segment 30 fitted with a snap-in recess 60 to allow detachably affixing the water draining chamber 50 which is fitted on its back side with a snap-in, respectively protruding rib 51 that can be affixed in frictional and/or geometrically interlocking manner in said snap-in recess 60. FIG. 1 shows that the water draining chamber's rib 51 runs in a direction R1 which is approximately perpendicular to the outer surface G of the water draining chamber 50 respectively to the outer surface A of the front pane 40. The configuration of the vehicle pane 40, profile element 10 and water draining chamber 50 is moreover selected in a manner that the resilient rib 51 of the water draining chamber 50 can be inserted in the direction R1 into the snap-in recess 60 of the profile element 10 and also be extracted in the opposite direction R2 from said profile element 10.

The snap-in recess 60 is bounded by a substantially L, U-shaped or hook-like resilient leg 62 and by a bearing rib 80, the latter being subtended by the first segment 20 and the second segment 30 of the profile element 10. The free end 64 of the resilient leg 62 and the bearing rib 80 subtend an engagement aperture 61 for the rib 51 of the water draining chamber 50.

The cross-section of the bearing rib 80 is approximately wedge-shaped and/or T-shaped. Between the pane's lower edge 42 and the inwardly protruding rib 51 of the water draining chamber 50, said bearing rib 80 constitutes a clamping, respectively a support element supporting on its face 91 the seal 90. Said seal 90 preferably is made of a soft-resilient material, for instance a thermoplastic elastomer (TPE), foam rubber or another suitable material such as an elastomer or rubber. It rests in sealing manner by means of a beaked edge 92 against the lower edge 42 of the vehicle pane 40 and— following installation of the water draining chamber 50—it will be compressed between said pane's lower edge 42 and the top edge 53 of the water draining chamber 50 in a way that the (unreferenced) outer surface of the seal 90 ends flush with the outer surface A of the pane 40 and with the outer surface G of the water draining chamber 50. As a result a smooth transition flush with the surfaces of the vehicle pane 40 and the water draining chamber 50 is attained.

Preferably the seal 90 shall be firmly bonded to the bearing rib 80. However it may also be integral with it.

Preferably, in region of the lower pane edge 42, the bearing rib 80 and the first segment 20 of the profile element 10 subtend a space 84, as a result of which, when in the installed configuration, the bearing rib may yield elastically when resting against the pane 40. This feature offers more than durably good and reliable sealing. The bearing rib 80 and the sealing lip 90 also may compensate tolerances between the pane 40 and the water draining chamber 50.

At its free end 64 within the snap-in recess 60, the resilient leg 62 is fitted with an indentation 63. In the installed state of the water draining chamber 50, said indentation engages from behind a beaked edge 52 at the rib 51 which thereby is always affixed in frictionally and/or geometrically interlocking manner in the snap-in recess 60 of the profile element 10. To improve the insertion of rib 51 into said snap-in recess a beaked edge 52 and the free end 64 of the resilient leg 62 are fitted within (unreferenced) bevels. The bearing rib 80 also is fitted with the snap-in recess 60 with an indentation 83 which shall be discussed further below.

To assure installing the water draining chamber 50 both quickly and simply—without thereby stressing the adhesive bond between the profile element 10 and the vehicle pane 40—a rib-shaped detent element 70 is provided within the snap-in recess 60 and runs in the longitudinal direction of the profile element 10. Said detent element 70 is at least partly elastically deforming, being made of a highly compliant material such as a thermoplastic elastomer (TPE), a foam rubber, or another appropriate material, and being designed in a manner that only a slight force is required to insert the rib 51 of the water draining chamber 50 in the direction of assembly R1, whereas its extraction from said snap-in recess in the opposite direction R2 requires a comparatively substantially larger force.

As shown in FIG. 1, the detent element 70 is configured within the snap-in recess 60 at an angle α relative to the directions R1, R2 and hence subtends an acute angle with the rib 51 of the water draining chamber 50. Said detent element furthermore enters at least in part the engagement aperture 61 of said recess and may engage, within this recess, the rib 51 of the water draining chamber 50 in frictionally and/or geometrically interlocking manner, as a result of which, in the installed mode, said rib 51 is locked durably but detachably.

To reinforce the above feature, the detent element 70 is fitted with at its free longitudinal edge 72 with a convex or a beaked edge 71 whereas the rib 51 of the water draining chamber 50 is fitted with an associated beaked edge 52 respectively indentation. In this manner, when the water draining chamber 50 is installed, the free end of the detent element 70 respectively its convex or beaked edge 71 can rest on said chamber's rib 51 which also runs in the longitudinal direction of the profile element 10, and consequently permanent firm locking has been achieved.

FIG. 1 further shows that the detent element 70 as well as the seal 90 are affixed to the bearing rib 80, namely in the region of the indentation 83. Further said detent element comprises a tapered zone 74 between the connecting zone 73 at the bearing rib 80 on one hand and on the other the terminal convex or beaked edge 71, resulting in an approximately concave cross-sectional surface. Said surface allows the detent element 70 to get out of the way laterally or transversely to its longitudinal direction as soon as the rib 51 of the water draining chamber 50 has been inserted into the snap-in recess. To enhance this effect, the rib 51 is fitted with a bevel or flank 55 which is able to press the detent element 70 to the side. Depending on the designed magnitude of the applied force used to insert the rib 51 into the snap-in recess 60, the detent element 70 also may be cross-sectionally a wedge or a rectangle/parallelepiped.

Both the detent element 70 and the seal 90 are preferably firmly bonded to the bearing rib 80. However they also may be integral with it.

Figure 2:
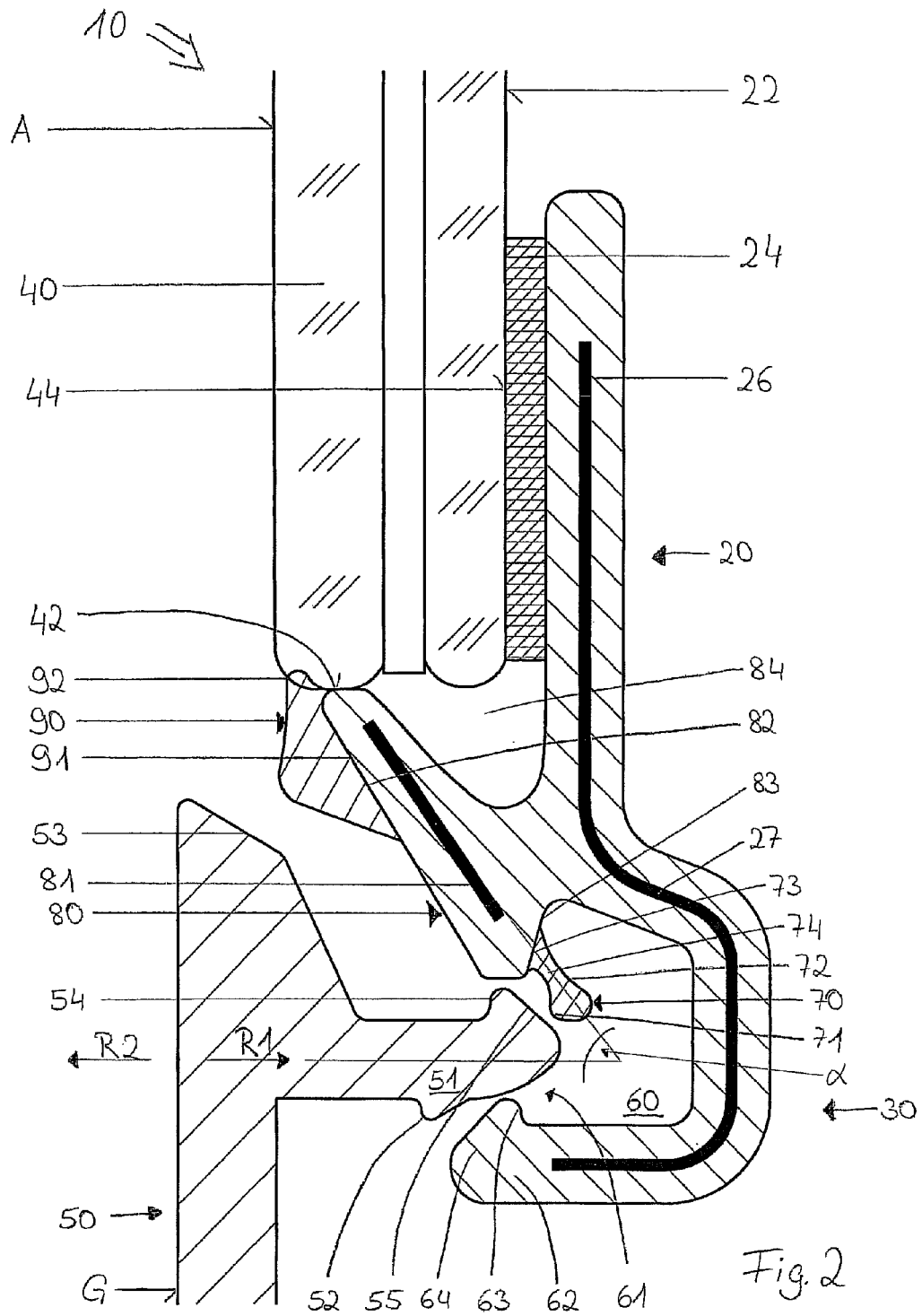
FIG. 2 is a schematic sideview of the sealing system prior to water draining chamber installation.

FIG. 2 illustrates the sealing system constituted by the vehicle pane 40, the profile element 10 affixed to said pane and the water draining chamber 50 as yet uninstalled. Accordingly the water draining chamber's rib 50 has not yet entered and engaged said profile element's snap-in recess 60.

Figure 3:
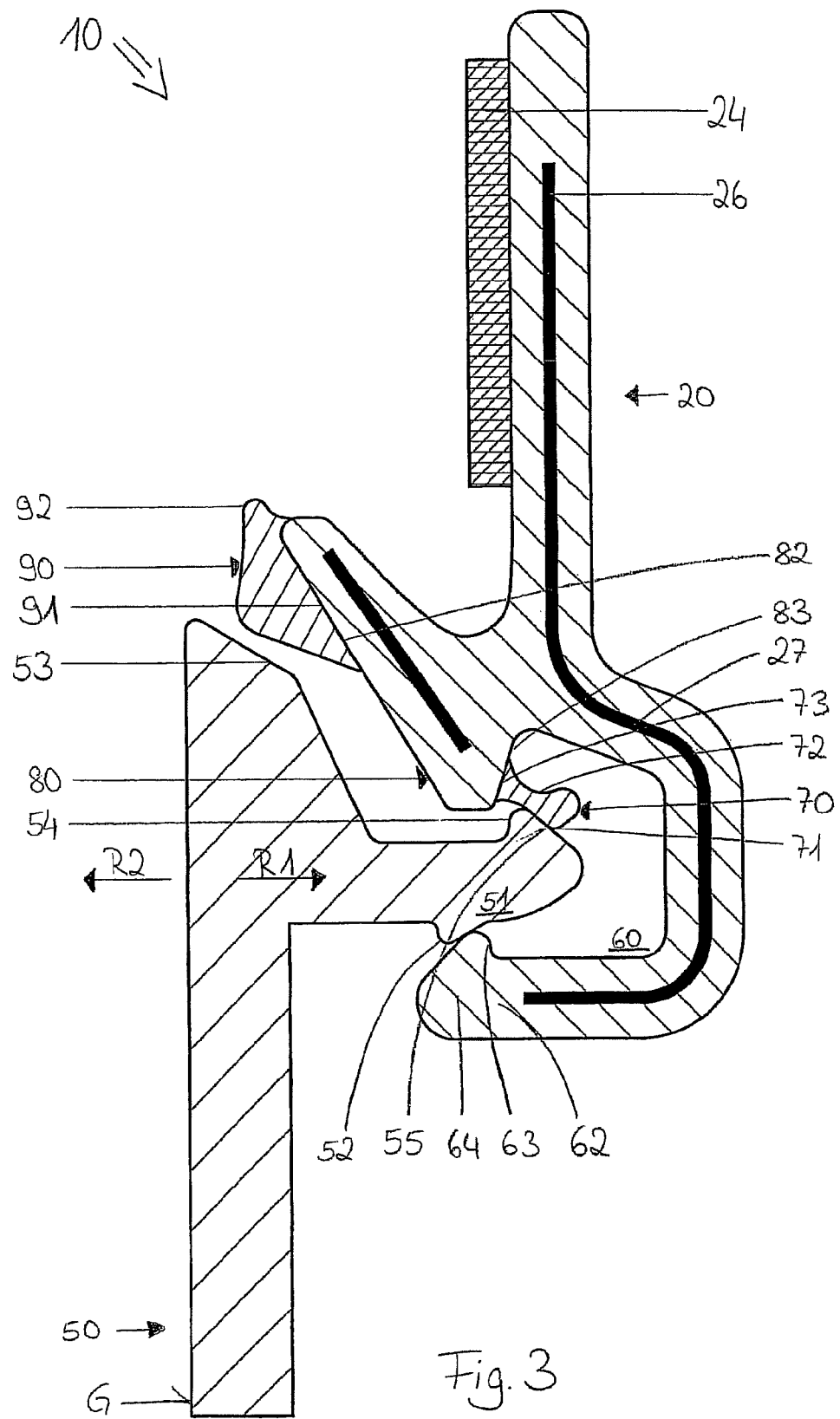
FIG. 3 is a schematic sideview of the sealing system of FIG. 1 during the joining procedure.

On the other hand FIG. 3 makes it plain that, when being inserted into the snap-in recess 60, the rib 51 of the water draining chamber 50 displaces the detent element 70 entering said snap-in recess' engagement aperture 61 at an angle α to the direction of assembly R1. In the process the rib 51 by means of its bevel 55 laterally forces the detent element 70 into the indentation 83 of the bearing rib 80, such displacement being implemented relatively easily on account of the said detent element's selected cross-section as well as its selected material. The water draining chamber's rib 51 therefore is inserted at relatively little effort into the profile element 10 of which the adhesive bond to the vehicle pane 40 is stressed very little. Additional support of the profile element 10 relative to the vehicle body is unnecessary.

As soon as the water draining chamber 50 has reached its final position, the detent element 70 engages the indentation 54 at the rib 51, the convex or beaked edge 71 of the detent element 70 resting in frictionally and/or geometrically interlocking manner on the rib 51. Accordingly the detent element 70 acts as a hooked barb which affixes the water draining chamber 50 respectively its rib 51 against the profile element 10 in frictionally and geometrically interlocking manner in the snap-in recess 60 respectively at the profile element 10.

When the water draining chamber 50 must be released from its position locked to the profile element 10, the rib 51 must overcome the resistance of the barbed hook 70 configured transversely to it within the snap-in recess 60, however this time against a substantially larger resistance than encountered in the assembly procedure. Accordingly, the water draining chamber 50 is always anchored securely in the profile element 10, though, when necessary, and as described above, it may be extracted and, as also described above, it may be reinstalled without resort to a substantial force.

A reinforcing insert 26, for instance a strip of aluminum or steel, is preferably fitted into the first segment 20 of the profile element 10 and into the resilient leg 62 of the second segment 30. This reinforcing insert 26 may run as far as an inflection point 27 between the first segment 20 and the second segment 30 of the profile element, or, as shown, as far as into the resilient leg 62. Said insert by-and-large follows the shape of the profile element 10, though it may be shorter or longer than indicated. A reinforcing insert 81 within the bearing rib 80 increases both the dimensional stability of the profile element 10 and the bearing capacity of the rib 80.

An omitted row of perforations/holes furthermore may be fitted into the central region of the partial surfaces of the first segment 20. Two or more rows of holes in the central surface portion of the first segment 20 may also be used. In this manner a cement or the like in addition to an omitted bead of glue deposited on the first segment 20 of the profile element 10 may advance as far as the back side 44 of the pane 40.

The present invention is not restricted to the above discussed embodiment modes and may be modified in many ways. Illustratively the detent element may be configured at the bearing rib 80 instead of at the resilient leg 62. In that design the rib 51 of the water draining chamber 50 would be in mirror-image form. However two detent elements 70 also might be used, that would be mounted on the two sides of the rib 51. In another variation, at least one detent element 70 is fitted on the rib 51 of the water draining chamber 50. The convex or beaked edge 71 of the, respectively each, detent element 70 then would rest against the profile element 10 in the case of the installed position of the water draining chamber 50, as a result of which the detent element engages frictionally and/or in geometrically interlocking manner the profile element. Furthermore, one detent element 70 each may be constituted at the profile element 10 and at the rib 51 of the water draining chamber 50.

In an embodiment, the detent element 70 in the form of a barbed hook allows inserting the rib 51 into the snap-in recess 60 without requiring a considerable force. On the other hand extracting the rib 51 out of the snap-in direction 60 is more arduous, so that the water draining chamber 50 is easily installed and firmly affixed and can be detached if needed.

In summary, the present invention relates to a profile element 10 serving to connect a vehicle pane 40 to a water draining case 50, said structure 10 comprising a first segment 20 for connection to a vehicle pane 40 and a second segment 30 to detachably affix a water draining chamber 50. The water draining chamber 50 is fitted with rib 51 which can be affixed in frictionally and/or geometrically interlocking manner in the snap-in recess 60. At least one seal 90 may be inserted between the lower edge 42 of the vehicle pane 40 and the upper edge 53 of the water draining chamber 50. Said seal constitutes a substantially smooth and flush transition between the surfaces of the vehicle pane 40 and the water draining chamber 50.

A detent element 70 for the rib 51 of the water draining chamber 50 is designed in a manner that it facilitates inserting the rib 51 into the snap-in recess 60 of the profile element 10 while raising the resistance to extracting the rib 51 out of said snap-in recess.

The detent element 70 is at least partly elastically deforming and subtends an angle α with the direction of assembly, and as a result acts as a barbed hook on the locked rib 51 of the water draining chamber 50. The detent element 70 enters at least segment-wise the engagement aperture 61 of the snap-in recess 60 and rests by its convex or beaked edge 71 in its engaged state against the rib 51 of the water draining chamber 50 or against the profile element 10 which for that purposes are fitted with indentations 52, 54, 63, 83.

A bearing rib 80 is configured between the first and second segments 20 and 30 respectively of the profile element 10 and may be cross-sectionally wedge-shaped, L or U shaped. The minimum of one seal 90 projects outward from said bearing rib 80.

The snap-in recess 60 is subtended by the bearing rib 80 and a resilient leg 62 which is cross-sectionally L, U or hook-shaped. The detent element 70 and the seal 90 may be integral with the bearing rib 80 or be firmly bonded to it and in particular may include a high-compliance, deforming convex element.

The profile element 10 and/or the detent element 70 and/or the resilient leg 90 may be made of a combination of materials, for instance in the form of a composite component which is soft externally and hard internally. The elasticity is enhanced by reinforcing inserts 26, 81. Appropriately the said contour structure's rest face 22 comprises contact zones that are mutually offset in height. An adhesive layer may be enclosed in between at the optionally perforated first segment 20, for instance a double-sided adhesive tape, rests in contact with its opposite walls and also is optionally perforated.

A profile element 10 to connect a vehicle 40 with a water draining chamber 50 comprises a first segment 20 which can be affixed to said vehicle pane, and a second segment 30 which is fitted with a snap-in recess 60 to allow detachably affixing said box. This water draining chamber 50 is fitted with a rib 51 which is affixable in frictionally and/or geometrically interlocking manner in the snap-in recess 60, further with at least one seal 60 subtending—in the installed position of the water draining chamber—a substantially smooth and flush transition zone between the vehicle pane 40 and the water draining chamber 50. To assure both simple and rapid installation of the water draining chamber—without thereby stressing the connection between said profile element and vehicle pane, the invention provides at least one detent element 70 designed in a manner that insertion of the rib 51 of the water draining chamber 50 into the snap-in recess 60 in a first direction R1 shall be facilitated but extraction of the rib 51 from the snap-in recess 60 in the opposite direction R2 shall meet a larger resistance.

All features and advantages, including design details, spatial configurations and procedural steps, implicit in and explicit from the claims, the specification and the appended drawings, may be construed being inventive per se or in arbitrary combinations.

LIST OF REFERENCES

A outer surface (of 40)
G outer surface (of 50)
R1 direction
R2 direction
K vehicle body
α angle
10 profile element
20 first segment
22 surface
24 adhesive layer/tape
26 reinforcing insert
27 inflection point
28 adhesive bead
30 second segment
40 vehicle pane
42 lower pane edge
44 back side
50 water draining chamber
51 rib
52 beaked-edge/indentation
53 upper edge
54 beak-edge/indentation
55 bevel/flank
60 snap-in recess
61 aperture
62 resilient leg
63 indentation
64 free end
70 detent element
71 beaked edge
72 free longitudinal edge
73 connecting zone
74 tapered zone
80 bearing rib
81 reinforcing insert
82 hard/soft boundary
83 indentation
84 space
90 sealing lip
91 bevel
92 beaked edge

The invention claimed is:

1. A profile element for connecting a vehicle pane to a water draining chamber, comprising:
   a first segment affixable to the vehicle pane;
   a second segment having, at an upper portion, a bearing rib having at least one seal configured to be disposed at a lower edge of the vehicle pane and, at a lower portion, a snap-in recess configured to receive, in an insertion direction between the bearing rib and a resilient leg of the snap-in recess, a rib of the water draining chamber through an engagement aperture which is delimited in the insertion direction by a lower-most surface of the bearing rib and an upper-most surface of the resilient leg; and
   a detent element which projects at an acute angle relative to the insertion direction into the snap-in recess such that the resilient leg of the snap-in recess is elastically deformed to a greater extent during an extraction of the rib of the water draining chamber from the snap-in recess than during an insertion of the rib of the water draining chamber into the snap-in recess so as to facilitate inserting the rib of the water draining chamber in the insertion direction into the snap-in recess and present a larger resistance to extracting the rib from the snap-in recess in an extraction direction opposite the insertion direction.

2. The profile element according to claim 1, wherein the detent element is rib-shaped and projects into the snap-in recess from one of the resilient leg and the bearing rib.

3. The profile element according to claim 1, wherein a free longitudinal edge of the detent element is formed as a barbed hook.

4. The profile element according to claim 1, wherein the detent element includes a tapered zone having a reduced cross-section between a connecting zone and a free longitudinal edge of the detent element.

5. The profile element according to claim 1, wherein a material forming the detent element is more elastic than a material forming the first and second segments.

6. The profile element according to claim 1, wherein a free longitudinal edge of the detent element has a convex or beaked edge that is configured to rest, in an installed state of the water draining chamber, on the rib of the water draining chamber in at least one of a frictionally and a geometrically interlocking manner.

7. The profile element according to claim 6, wherein the convex or beaked edge of the detent element is configured to engage an indentation of the rib of the water draining chamber in the geometrically interlocking manner in the installed state of the water draining chamber.

8. The profile element according to claim 1, wherein a free end of the resilient leg of the snap-in recess includes an indentation configured to engage a beaked edge of the rib of the water draining chamber from behind in the insertion direction in an installed state of the water draining chamber.

9. The profile element according to claim 1, wherein the detent element is affixed to the bearing rib behind the engagement aperture in the insertion direction, the detent element being configured to be displaced into an indentation of the bearing rib by a bevel of the rib of the water draining chamber during the insertion.

10. The profile element according to claim 1, further comprising the water draining chamber, wherein the detent element projects into the snap-in recess from the rib of the water draining chamber.

11. The profile element according to claim 1, wherein the at least one seal is configured to form a substantially flat and flush transition between surfaces of the vehicle pane and surfaces of the water draining chamber.

12. The profile element according to claim 1, wherein the bearing rib is formed from a stiffer material than the at least one seal.

13. The profile element according to claim 1, wherein at least one of the first and second segments are formed as extruded plastics fitted with a reinforcing insert.

14. A profile element for connecting a vehicle pane to a water draining chamber, comprising:
a first segment affixable to the vehicle pane;
a second segment having, at an upper portion, a bearing rib having at least one seal configured to be disposed at a lower edge of the vehicle pane and, at a lower portion, a snap-in recess configured to receive, in an insertion direction between the bearing rib and a resilient leg of the snap-in recess, a rib of the water draining chamber through an engagement aperture which is delimited in the insertion direction by a lower-most surface of the bearing rib and an upper-most surface of the resilient leg; and
a detent element which projects at an acute angle relative to the insertion direction into the snap-in recess such that, when the engagement aperture is viewed in the insertion direction, an end of the detent element is disposed between the lower-most surface of the bearing rib and the upper-most surface of the resilient leg so as to facilitate inserting the rib of the water draining chamber in the insertion direction into the snap-in recess and present a larger resistance to extracting the rib from the snap-in recess in an extraction direction opposite the insertion direction.

15. The profile element according to claim 14, wherein the detent element is rib-shaped and projects into the snap-in recess from one of the resilient leg and the bearing rib.

16. The profile element according to claim 14, wherein the detent element includes a tapered zone having a reduced cross-section between a connecting zone and a free longitudinal edge of the detent element.

17. The profile element according to claim 14, wherein a free longitudinal edge of the detent element has a convex or beaked edge that is configured to rest, in an installed state of the water draining chamber, on the rib of the water draining chamber in at least one of a frictionally and a geometrically interlocking manner.

18. The profile element according to claim 17, wherein the convex or beaked edge of the detent element is configured to engage an indentation of the rib of the water draining chamber in the geometrically interlocking manner in the installed state of the water draining chamber.

19. The profile element according to claim 14, wherein the detent element is configured to be displaced into an indentation of the bearing rib by a bevel of the rib of the water draining chamber during the inserting of the rib of the water draining chamber into the snap-in recess.

20. The profile element according to claim 14, wherein the at least one seal is configured to form a substantially flat and flush transition between surfaces of the vehicle pane and surfaces of the water draining chamber.

* * * * *